(12) United States Patent
Rucker et al.

(10) Patent No.: US 9,390,125 B2
(45) Date of Patent: *Jul. 12, 2016

(54) QUERY AUTHORING BY MODIFYING A VIEW OF THE RESULTS OF THE QUERY

(75) Inventors: Erik Jon Rucker, Seattle, WA (US);
Benjamin Neiman Hodes, Newton, MA (US); Arthur Charles Leonard, Redmond, WA (US); Kevin J. Boske, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,221

(22) Filed: Mar. 9, 2012

(65) Prior Publication Data

US 2012/0166427 A1 Jun. 28, 2012

Related U.S. Application Data

(63) Continuation of application No. 12/106,349, filed on Apr. 21, 2008, now Pat. No. 8,195,641.

(51) Int. Cl.
*G06F 17/30* (2006.01)

(52) U.S. Cl.
CPC ................................ *G06F 17/30392* (2013.01)

(58) Field of Classification Search
CPC .................... G06F 17/30398; G06F 17/30554; G06F 17/30392; G06F 17/30404
USPC .................................................. 707/759, 805
See application file for complete search history.

(56) References Cited

U.S. PATENT DOCUMENTS

| | | | |
|---|---|---|---|
| 5,421,008 A | 5/1995 | Banning et al. | |
| 5,826,257 A | 10/1998 | Snelling, Jr. | |
| 5,841,437 A | 11/1998 | Fishkin et al. | |
| 5,894,311 A | 4/1999 | Jackson | |
| 5,911,138 A | 6/1999 | Li et al. | |
| 6,208,985 B1 | 3/2001 | Krehel | |
| 6,553,371 B2 | 4/2003 | Gutierrez-Rivas et al. | |
| 6,768,997 B2 | 7/2004 | Schirmer et al. | |
| 6,931,391 B2 | 8/2005 | Tang et al. | |
| 2003/0055830 A1* | 3/2003 | Gutierrez-Rivas | G06F 17/30392 |

(Continued)

OTHER PUBLICATIONS

"Technical Data Sheet", Ardentia Search Limited, downloaded Jan. 4, 2008 from http://www.ardentiasearch.com/themes/ardentia/documents/netsearch$_{13}$ for_excel.pdf, 5 pages.

(Continued)

*Primary Examiner* — Monica Pyo
(74) *Attorney, Agent, or Firm* — Damon Rieth; Tom Wong; Micky Minhas

(57) ABSTRACT

Technologies and concepts are described herein for authoring a database query through the modification of a view of the data to be returned by the query. A user interface is provided for authoring a database query through the modification of a view of the data to be returned by the query that includes a view showing the results of a database query. A user interface is also provided for modifying the view to define the results of the query. As the view is modified, a query definition is generated which, when executed against the database, will return the results of the database query shown in the view. When the desired results are shown in the view, the query definition can be saved and run against the database to perform the database query.

18 Claims, 12 Drawing Sheets

(56) References Cited

U.S. PATENT DOCUMENTS

| | | | |
|---|---|---|---|
| 2005/0015364 | A1 | 1/2005 | Payton et al. |
| 2006/0248056 | A1* | 11/2006 | Fang et al. ............... 707/3 |
| 2006/0265391 | A1 | 11/2006 | Posner et al. |
| 2007/0005562 | A1 | 1/2007 | Chau et al. |
| 2007/0156740 | A1 | 7/2007 | Leland et al. |
| 2008/0319958 | A1* | 12/2008 | Bhattacharya et al. ......... 707/4 |

OTHER PUBLICATIONS

Giacinto et al. "Development, Implementation, and Maintenance of Geographical Information Systems with Remote Query Capabilities," downloaded Jan. 4, 2008 from http://proceedings.esri.com/library/userconf/proc00/professional/papers/PAP176/p176.htm, 11 pages.

Bennett et al., "Overview of Brio Insight," SADM Brio Insight Training Guide, Aug. 1, 2003, pp. 1-28.

Catarci et al., Visual Query Systems for Databases: A Survey, 1995, CiteSearch, 40 pages.

U.S. Official Action dated Feb. 8, 2011 in U.S. Appl. No. 12/106,349.

U.S. Official Action dated Aug. 12, 2011 in U.S. Appl. No. 12/106,349.

U.S. Notice of Allowance dated Dec. 7, 2011 in U.S. Appl. No. 12/106,349.

\* cited by examiner

| ID ▶ | USERNAME ▶ | USER PERMISSION ▶ | E-MAIL ADDRESS ▶ |
|---|---|---|---|
| 1 | JSMITH | USER | JSMITH@MICROSOFT.COM |
| 2 | TJONES | USER | TJONES@MICROSOFT.COM |
| 3 | BJOHNSON | ADMIN | BJOHNSON@MICROSOFT.COM |
| 4 | KBROWN | CONTRIBUTOR | KBROWN@MICROSOFT.COM |
| 5 | NWILSON | USER | NWILSON@MICROSOFT.COM |

SELECT * FROM [USERS]

*Fig. 2*

| ID ▶ | USERNAME ▶ | USER PERMISSION ▶ | E-MAIL ADDRESS ▶ |
|---|---|---|---|
| 3 | BJOHNSON | ADMIN | BJOHNSON@MICROSOFT.COM |
| 1 | JSMITH | USER | JSMITH@MICROSOFT.COM |
| 4 | KBROWN | CONTRIBUTOR | KBROWN@MICROSOFT.COM |
| 5 | NWILSON | USER | NWILSON@MICROSOFT.COM |
| 2 | TJONES | USER | TJONES@MICROSOFT.COM |
| | | | |
| | | | |

SELECT * FROM [USERS] ORDER BY USERNAME

*Fig. 5*

| ID ▶ | USERNAME ▶ | USER PERMISSION ▶ | E-MAIL ADDRESS ▶ |
|---|---|---|---|
| 4 | KBROWN | CONTRIBUTOR | KBROWN@MICROSOFT.COM |
| 5 | NWILSON | USER | NWILSON@MICROSOFT.COM |
| | | | |
| | | | |
| | | | |
| | | | |

```
SELECT * FROM [USERS]
WHERE [USERNAME] = 'KBROWN' AND
WHERE [USERNAME] = 'NWILSON'
```

*Fig. 6*

QUERY AUTHORING BY MODIFYING A VIEW OF THE RESULTS OF THE QUERY

CROSS-REFERENCE TO RELATED APPLICATIONS

This application is a continuation of co-pending U.S. application Ser. No. 12/106,349 entitled "Query Authoring by Modifying a View of the Results of the Query" filed Apr. 21, 2008, which is expressly incorporated herein by reference.

BACKGROUND

In order to query a database for a subset of the data stored therein, it is necessary to create a database query. This often requires a user to create a query definition in the form of a complex declarative query statement. For instance, in some systems it may be necessary for a user to create a Structured Query Language ("SQL") statement in order to select a subset of the contents of a database. Creation of such statements generally requires the user to not only understand SQL, but also requires the user to understand the structure of the database. As a result, creation of such statements is often too complex for many computer users.

Many different graphical user interfaces ("GUIs") have been created in order to simplify the process of creating a database query. For instance, a Query By Example ("QBE") user interface allows the creation of database queries using examples based on a text string, the name of a document, or a list of documents. While these previous user interfaces, like QBE, are easier than manually creating SQL statements, these user interfaces are still very abstract and frequently require the user to understand the structure of the database that is being queried. As a consequence, it can still be very difficult for a user to create a database query even when utilizing previous GUIs for creating database queries.

It is with respect to these considerations and others that the disclosure made herein is presented.

SUMMARY

Technologies and concepts are described herein for authoring a database query through the modification of a view of the data to be returned by the query. In particular, through the embodiments presented herein, a user can author a database query by viewing and directly manipulating the data to be returned from the query rather than by manipulating the query definition. In this way, a user can visually construct a database query that returns a desired subset of a database without creating a complex query statement and without any previous understanding of the structure of the database.

According to one aspect presented herein, a user interface is provided for authoring a database query through the modification of a view of the data to be returned by the query. In particular, a view is displayed showing the results of a database query. A user interface is provided for modifying the view to define the results of the query. As the view is modified, a query definition is generated which, when executed against the database, will return the results of the database query shown in the view. When the desired results are shown in the view, the query definition can be saved and run against the database to perform the database query.

According to other aspects, user interfaces may also be provided for adding a field from a table in the database to the view, for removing a field from the view, for sorting the view based upon a field contained in the view, for filtering the view, for grouping the view, for aggregating the view, and for performing a database join operation between fields in the view and fields in another database table. As these operations are performed on the view, the query definition is updated. According to other aspects, user interfaces are provided for defining and executing action queries, such as a delete query, an update query, an append query, and a make table query.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2-9 are screen diagrams showing aspects of a query design surface user interface and several related user interfaces provided in embodiments presented herein.

DETAILED DESCRIPTION

Figure 1:
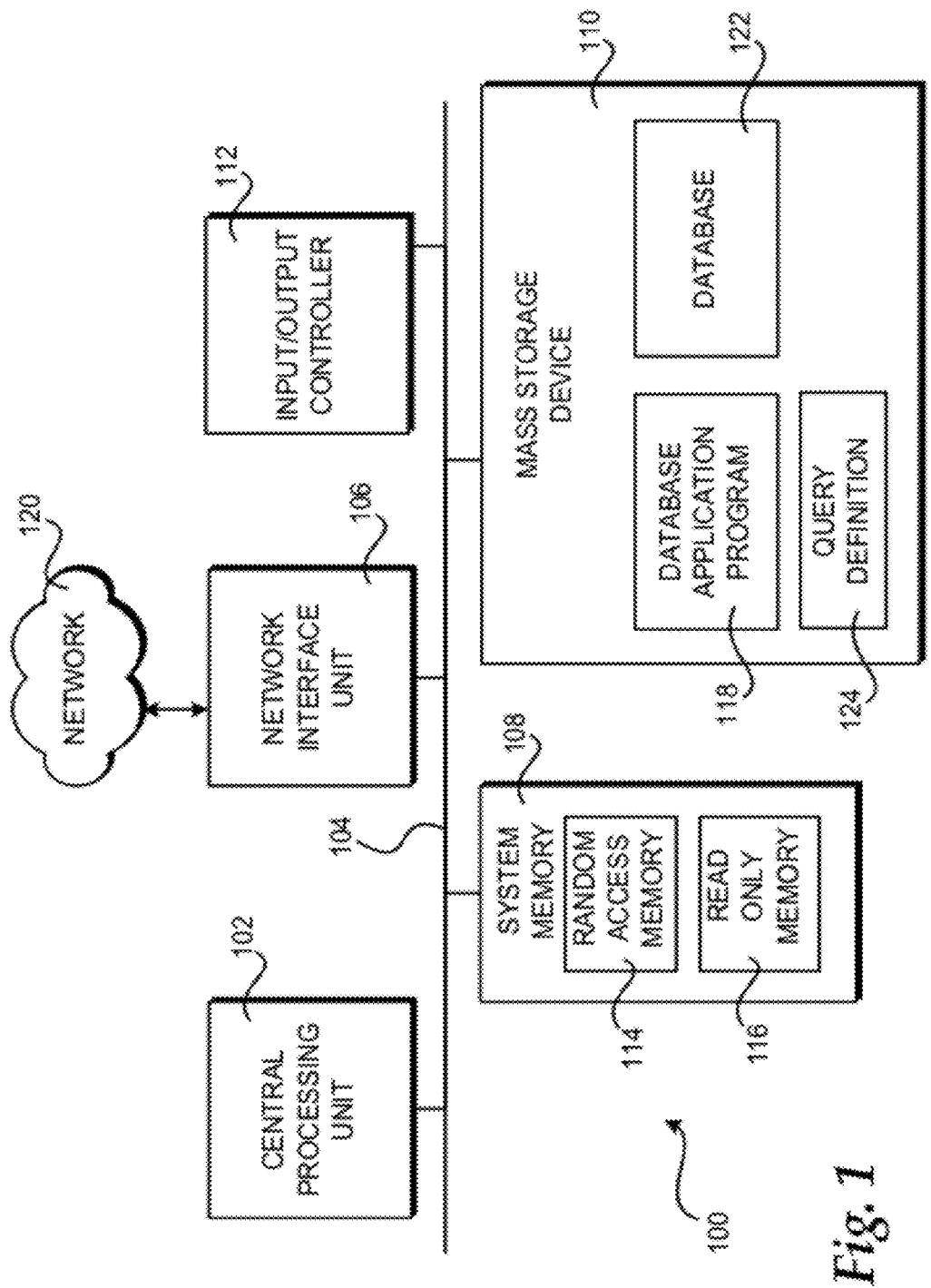
FIG. 1 is a computer architecture diagram showing an illustrative computer hardware and software architecture for a computing system capable of implementing aspects of the embodiments presented herein.

The following detailed description is directed to technologies for authoring a database query through the modification of a view of the data to be returned by the query. Through the use of the technologies and concepts presented herein, a database query can be authored by directly manipulating the data to be returned from the query rather than by manipulating the query definition as in prior solutions. This process makes it easier to predict the results of running a query because the query author views the query results as they are defining the query and therefore significantly increases the changes of creating a query that will return desired results.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for authoring a database query through the modification of a view of the data to be returned by the query will be described.

Turning now to FIG. 1, details will be provided regarding an illustrative operating environment for the embodiments presented herein. In particular, FIG. 1 shows aspects of an illustrative computer architecture for a computer 100 capable of executing the software components described herein for authoring a database query through the modification of a view of the data to be returned by the query. The computer architecture shown in FIG. 1 illustrates a conventional desktop, laptop, or server computer and may be utilized to execute any aspects of the software components presented herein.

The computer architecture shown in FIG. 1 includes a central processing unit 102 ("CPU"), a system memory 108, including a random access memory 114 ("RAM") and a read-only memory ("ROM") 116, and a system bus 104 that couples the memory to the CPU 102. A basic input/output system containing the basic routines that help to transfer information between elements within the computer 100, such as during startup, is stored in the ROM 116. The computer 100 further includes a mass storage device 110 for storing an operating system 118, application programs and other program modules, and data, each of which are described in greater detail herein.

The mass storage device 110 is connected to the CPU 102 through a mass storage controller (not shown) connected to the bus 104. The mass storage device 110 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available computer storage media that can be accessed by the computer 100.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network such as the network 120. The computer 100 may connect to the network 120 through a network interface unit 106 connected to the bus 104. It should be appreciated that the network interface unit 106 may also be utilized to connect to other types of networks and remote computer systems. The computer 100 may also include an input/output controller 112 for receiving and processing input from a number of other devices, including a keyboard, mouse, or electronic stylus (not shown in FIG. 1). Similarly, an input/output controller may provide output to a display screen, a printer, or other type of output device (also not shown in FIG. 1).

As mentioned briefly above, a number of program modules and data files may be stored in the mass storage device 110 and RAM 114 of the computer 100, including an operating system 118 suitable for controlling the operation of a networked desktop, laptop, or server computer. The mass storage device 110 and RAM 114 may also store one or more program modules. In particular, the mass storage device 110 and the RAM 114 may store the database application program 118, a query definition 124, and a database 122, each of which are described in greater detail below with respect to FIGS. 2-10B. The mass storage device 110 and the RAM 114 may also store other types of program modules.

The database application program 118 shown in FIG. 1 is configured to allow a user of the computer 100 to create, modify, and query a database 122. In order to query the database 122, the user of the computer 100 must create a query definition 124. The query definition 124 specifies how the database 122 should be queried. For instance, in one embodiment, the query definition 124 comprises a SQL statement that is utilized by the database application program 118 to query the database 122. It should be appreciated, however, that the query definition 124 may be specified using other types of query languages or formats. It also should be appreciated that the database 122 may comprise a relational database, a multi-dimensional database, or another type of database known in the art.

It should further be appreciated that although the database application program 118 and the database 122 are shown in FIG. 1 as residing on the same computer 100, these components may be stored and executed by different computing systems. For instance, in one implementation, the database application program 118 may operate on a network connected client computer and the database 122 may be stored at a server computer and made accessible through the use of a database server program. In this regard, it should be appreciated that the embodiments presented herein are not limited to any particular network topology or implementation for making the database 122 accessible to the database application program 118.

As will be described in greater detail below, the database application program 118 provides a graphical user interface for authoring the query definition 124 by viewing and directly manipulating the data to be returned from the query rather than by manipulating the query definition 124. In this regard, the database application program 118 constructs the query definition 124 based on a user's interaction with a query design surface user interface. Through the query design surface, the user can define the results to be returned when the query definition 124 is executed against the database 122. Additional details regarding this process are provided below with respect to FIGS. 2-10B.

Referring now to FIG. 2, details regarding the query design surface user interface 200 provided by the database application program 118 in one embodiment will be described. The query design surface 200 is displayed by the database application program 118 in response to a user requesting to create a query of the database 122. In general, the query design surface 200 displays a view of the results of a query of the database 122 and provides user interface controls for modifying the view to define the results of the database query. Based on the user interaction with the query design surface 200, the database application program 118 updates the query definition 124 such that when the query definition 124 is executed against the database 122, the results shown in the query design surface 200 will be returned. In this manner, a user can utilize the query design surface 200 to define the results of a query rather than defining the query definition 124 itself.

In the implementation shown in FIG. 2, the query design surface 200 comprises a grid that shows all of the database records that will be returned when the query is performed against the database 122. In this implementation, the query design surface 200 includes one or more columns 202A-202C that correspond to a field within a table of the database 122 that is to be queried. The query design surface 200 further comprises one or more rows 204A-204F that correspond to records within the table of the database 122. It should be appreciated however, that other suitable arrangements of the fields and records displayed within the query design surface 200 may be utilized.

In one embodiment presented herein, the database application program 118 provides a wizard user interface for initiating the database query. In this implementation, the columns 202A-202C and rows 204A-204F of the query design surface 200 are populated with the fields and records from the table of the database being queried. For instance, in the illustrative query being created in FIG. 2, the table of the database 122 being queried includes three fields called "Username", "User Permission", and "E-mail Address." The table also includes five records illustrated in the rows 204A-204E. As will be described in greater detail below, the query design surface 200 also provides user interface functionality for adding additional fields and for removing fields. For instance, as will be described below with respect to FIG. 3, a field list may be provided showing additional fields available within the database table or within other database tables. The user may utilize an appropriate input mechanism to place fields from the field list onto the query design surface 200. A user may also remove fields from the query design surface 200, for instance by selecting and dragging one of the columns 202A-202C off the query design surface 200. In this manner, a user can specify which fields of the database table should be included in the query.

It should be appreciated that, as a user interacts with the query design surface 200, the contents of the query definition 124 are continually updated. For instance, in the example shown in FIG. 2, a query definition 124 has been generated that will return the database records shown in the query design surface 200. In this case, a SQL select query has been generated which, when run against the database 122, will show the records being displayed in the query design surface 200. It should be appreciated that the database application program 118 continually updates the query definition 124 as a user interacts with the query design surface 200.

Figure 3:
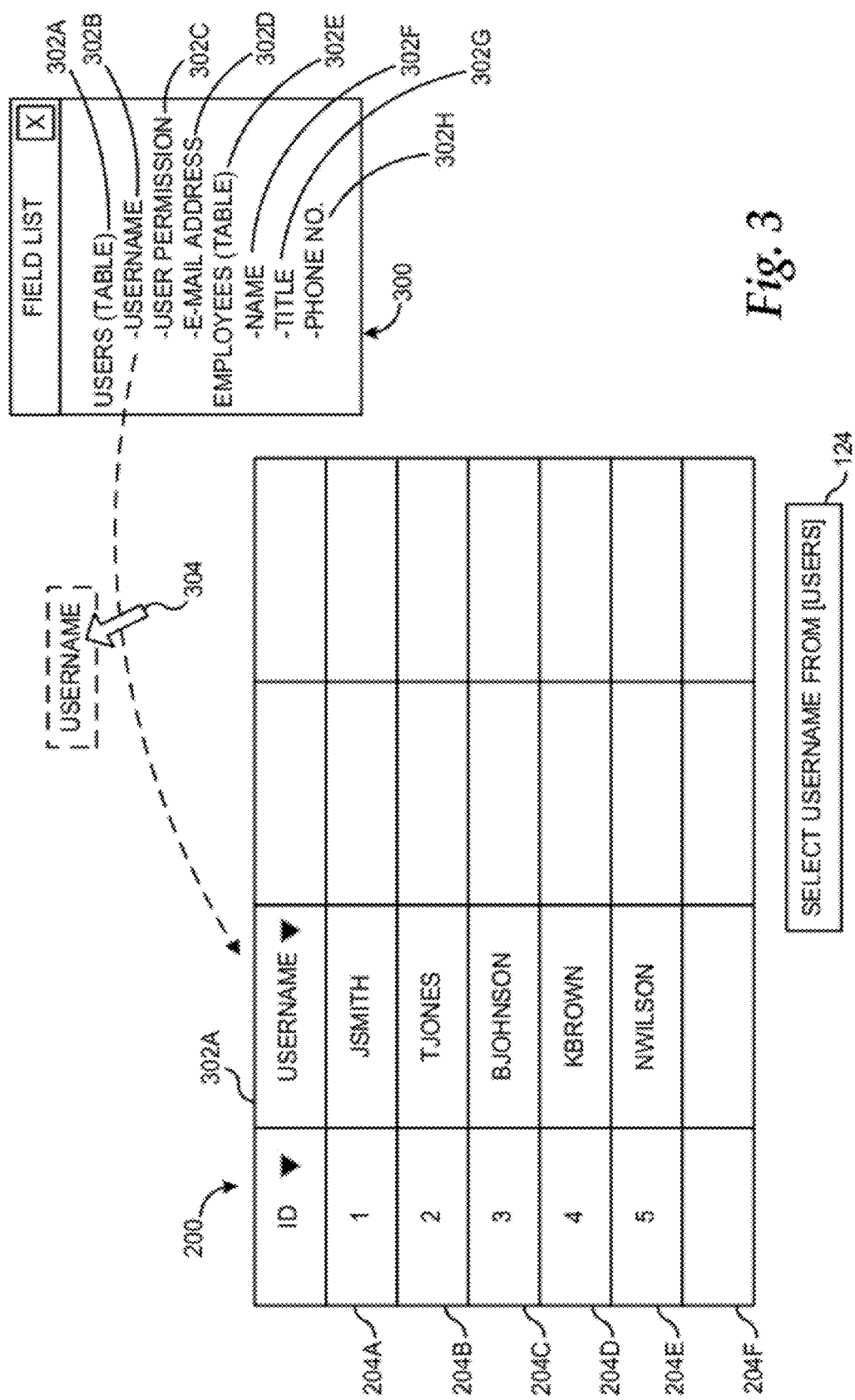

As shown in FIG. 3, the database application program 118 may also allow a user to start with a blank query design surface 200 and to build the query by adding fields to the query design surface 200. In this regard, a field list 300 may be displayed that shows the fields available from a current table in the database 122 and from other tables. For instance, the field list 300 shown in FIG. 3 includes selectable items 302A-302H corresponding to a table entitled "Users" that includes fields entitled "Username", "User Permission", "E-mail Address", and a table entitled "Employees", that includes fields entitled "Name", "Title", and "Phone No." In one embodiment, the selectable items 302A-302H may be selected with an appropriate user input device, such as the mouse cursor 304, and dragged onto the query design surface 200.

In the example shown in FIG. 3, the selectable item 302 corresponding to the "Username" field has been selected and dragged onto the query design surface 200. In response to such an operation, a column 202A has been created for the username field and the rows 204A-204E have been populated with the records from the field contained within the table of the database 122. Additionally, as discussed above, the database application program 118 has also updated the contents of the query definition 124 based on the user's interaction with the query design surface 200. In this example a SQL statement has been generated for selecting the "Username" field from the "Users" table. It should be appreciated, that this mechanism may be utilized by a user to add virtually any field from any available table to a database query. As discussed above, a similar mechanism may also be utilized to permit a user to remove a field from the database query.

As will be discussed in greater detail below, a user may also select fields from a table other than the table that is currently within the context of the query design surface 200. For instance, in the example shown in FIG. 3, the selectable items 302E-302H correspond to a second database table. If a user elects to add one of the fields from the second database table to the query deign surface 200, an appropriate database join operation will be performed with the field of the second table. Moreover, the database application 118 will update the query definition 124 to reflect the join operation. A user interface may be provided to the user to allow them to specify the manner in which the database join operation should be performed. Additional details regarding this process will be provided below.

Figure 4:
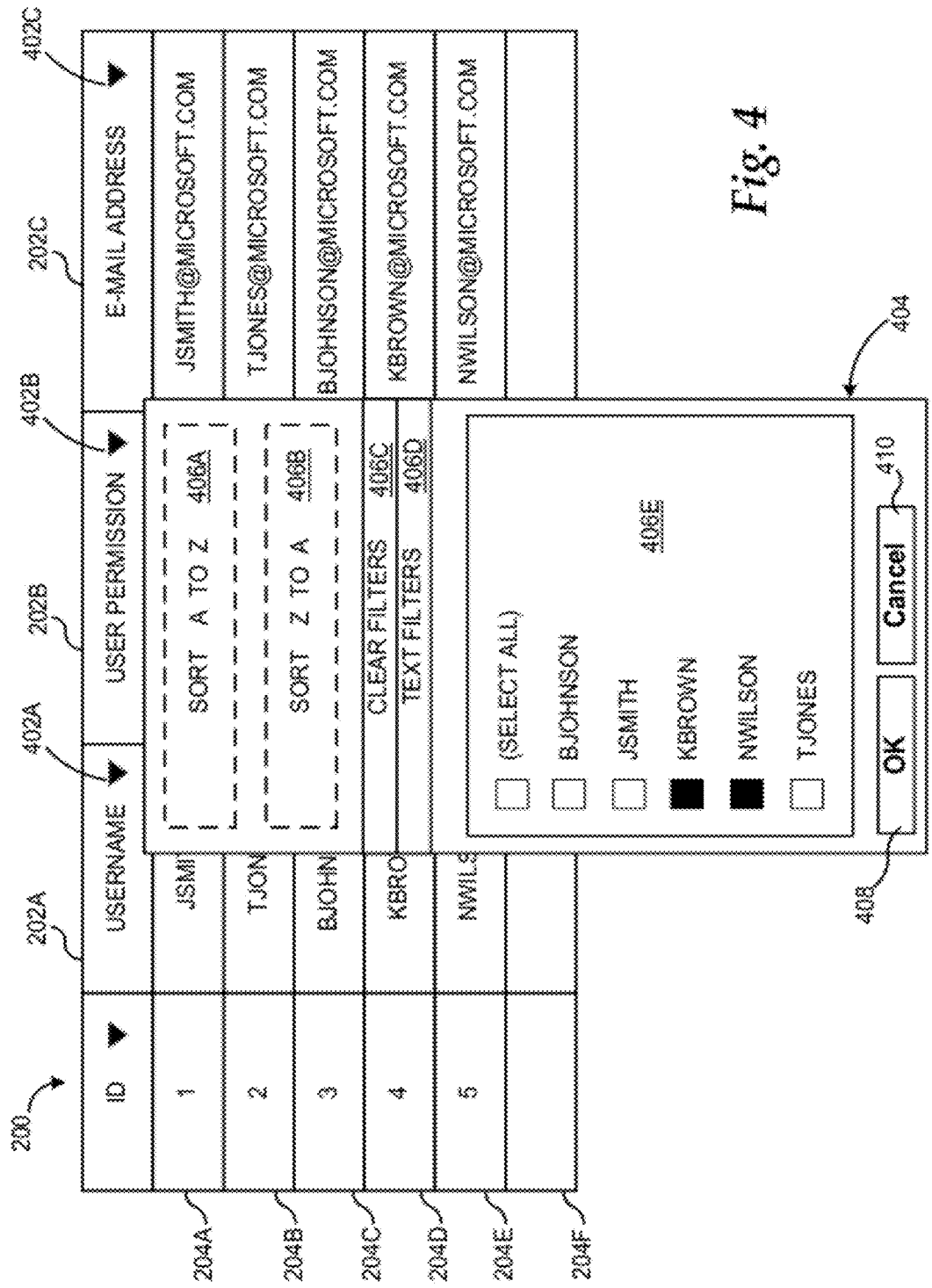

Referring now to FIG. 4, additional details regarding the functionality provided by the query design surface 200 will be described. In particular, in one embodiment, each of the columns 202A-202C includes a selectable control 402A-402C. In the example shown in FIG. 4, the selectable control 402A-402C comprises an inverted triangle. Other user interface controls may also be utilized to perform the functionality described below. When a user selects one of the selectable controls 402A-402C, a menu 404 is displayed. For instance, in the example shown in FIG. 4, a user has selected the selectable control 402A corresponding to the column 202A. In response to the selection, the menu 404 has been displayed.

As shown in FIG. 4, the menu 404 includes a number of items 406A-406E that allow a user to sort and filter the records in the active column. In the example shown in FIG. 4, the menu 404 may be utilized to sort and filter the records shown in the column 202A. In particular, the item 406A may be selected to sort the records from A to Z and the item 406B may be selected to sort the records from Z to A. For instance, FIG. 5 shows the contents of the query design surface 200 following the selection of the item 406A for sorting the records shown in the column 202A from A to Z. FIG. 5 also illustrates the contents of the query definition 124 following the selection of the item 406A. As shown in FIG. 5, the database application program 118 has updated the query definition 124 to reflect the ordering of the records in the column 202A.

As described briefly above, the menu 404 also includes items 406C-406E that may be utilized to filter the contents of the current row. For instance, in one embodiment, a number of check box filters are provided. The check box filters easily allow a user to specify the records within the field 202A that should be filtered. For instance, the example shown in FIG. 4, a user has selected check boxes corresponding to a record "KBROWN" and a record "NWILSON". When a user selects the control 408, this will cause the contents of the query design surface 200 to be filtered by the selected records. The user interface shown in FIG. 6 illustrates the results of this filtering. In the example shown in FIG. 6, only the records having a user name of KBROWN and NWILSON are shown in the column 202A. As also shown in FIG. 6, the database application program 118 has updated the query definition 206 to reflect the filtering specified through the use of the check box filters. It should be appreciated that although check boxes are described in the embodiment herein, any suitable user interface control may be utilized to specify the records upon which the columns should be filtered. It should also be appreciated that, at any time, a user may select the control 410 to cancel application of the selections made within the menu 404.

As will also be described in greater detail below, the item 406D may be selected to specify one or more text filters that should be applied to the currently active column. Details regarding this process are provided below with respect to FIG. 7A. A user may also select the item 406C to clear the filters from the currently selected column. In view of the user interface as shown in FIGS. 4-6, it should be appreciated that a user may interact directly with the data to be returned by a database query to sort and filter the data. In response to these actions, the database application program 118 updates the query definition 124 for returning the data specified by the user through the query design surface 200.

Figure 7A:
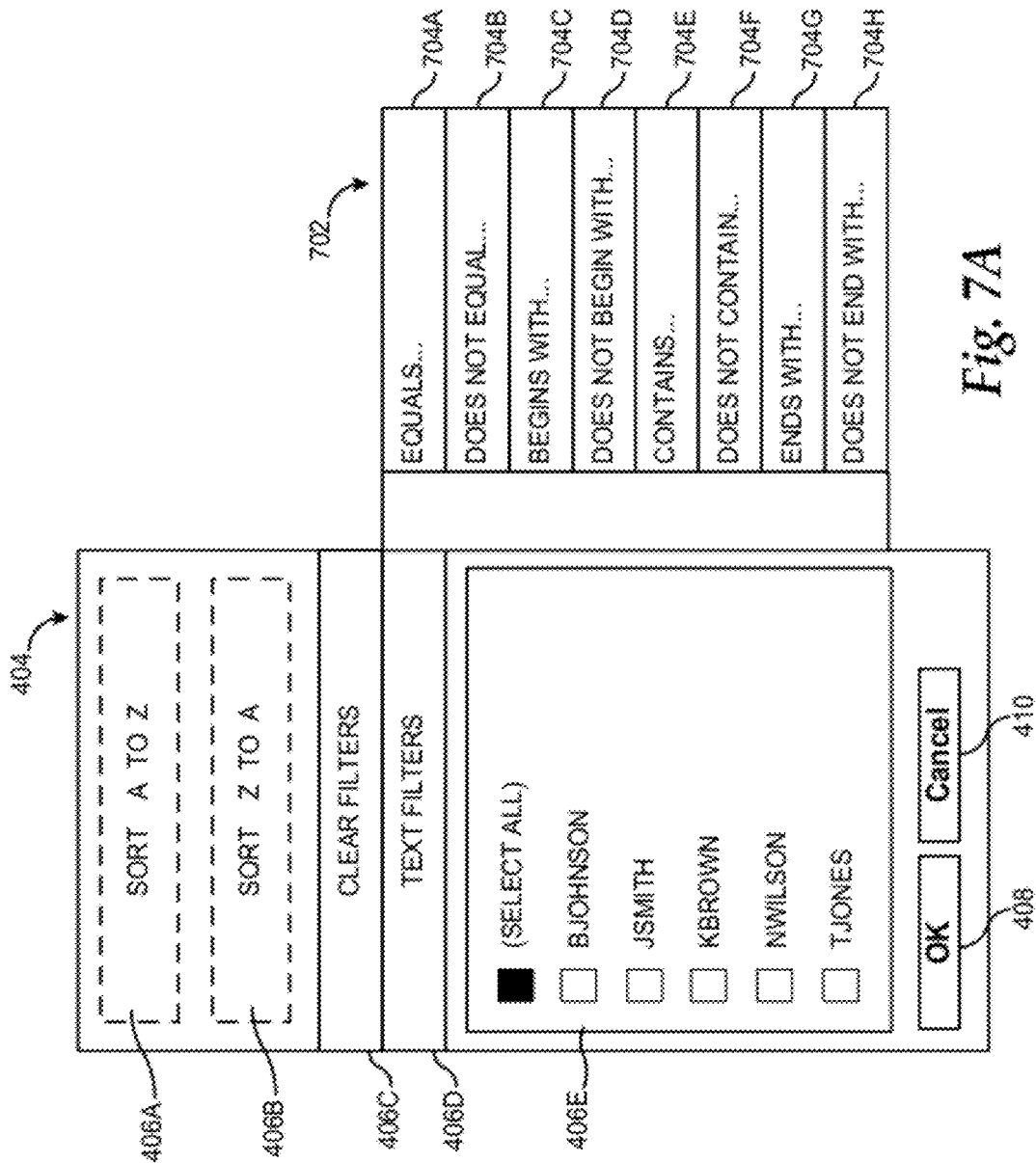
Figure 7B:
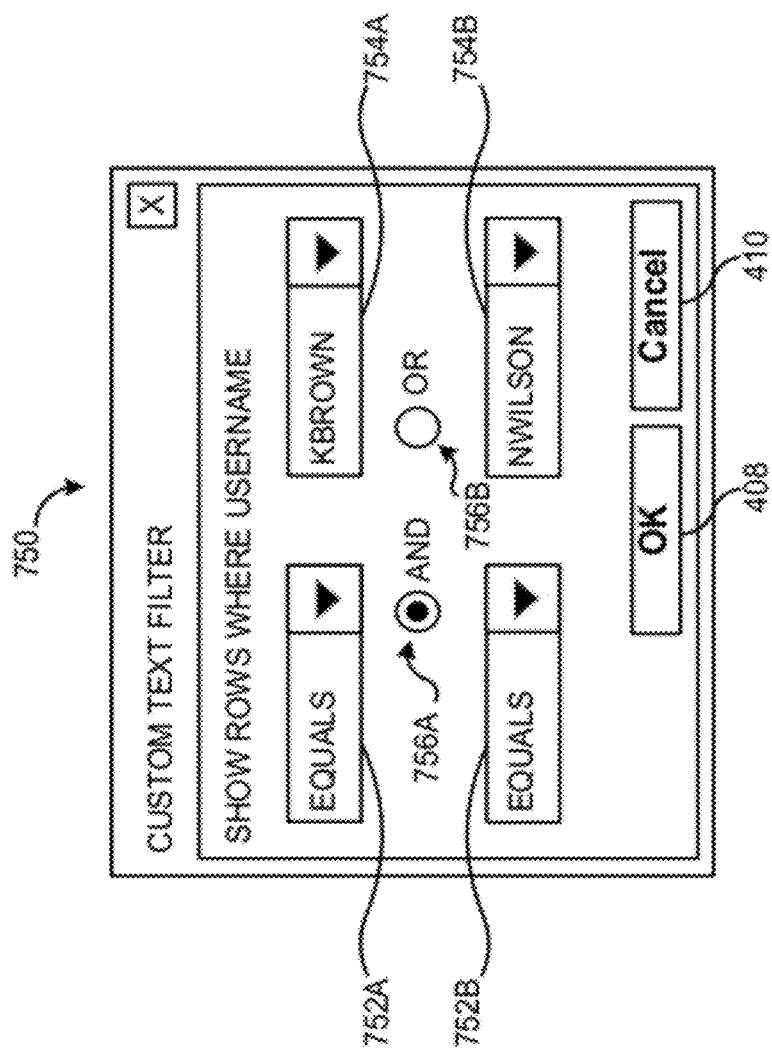

Referring now to FIGS. 7A-7B, additional details will be provided regarding the functionality provided by the query design surface 200 for setting a text filter. As discussed briefly above, the item 406D may be selected within the menu 404 to specify a custom text filter to be applied to the records within the current database table. In response to such a selection, a menu 702 is displayed. As shown in FIG. 7A, the menu 702 includes selectable items 704A-704H corresponding to criteria that may be applied to the particular text filter. For instance, the item 704A-704H may be selected to specify that only records that equal, do not equal, begin with, do not begin with, contain, do not contain, end with, or do not end with a specified text string be displayed within the query design surface 200.

In response to the selection of one of the items 704A-704H, the user interface 750 shown in FIG. 7B may be displayed. Through the user interface 750, a user can specify the text string that should be utilized within the filter, specify additional text filters, and indicate whether an AND/OR relationship should be utilized between the text filters. For example, in the user interface shown in FIG. 7B, the user has typed the text string "KBROWN" in the field 754A and typed the string "NWILSON" in the field 754B. The user has also specified that the provided text strings should only be displayed when they equal the records in the database 122 through the drop down menu 752A-752B. It should be appreciated that while two fields 754A-754B and two drop down menus 752A-752B have been illustrated in FIG. 7B, fewer or more fields 754 and drop down menus 752 may be utilized in other embodiments.

The user interface controls 756A and 756B shown in FIG. 7B may be utilized to specify whether the two text filters should be utilized conjunctively or disjunctively. In this way, a user has recreated the filter described above with respect to FIG. 4. As a result, if the user selects the user interface control 408, the query definition 124 shown in FIG. 6 will be created and the records shown in the query design surface 200 illustrated in FIG. 6 will be displayed. A user may select the user interface control 410 to cancel the application of the custom text filter. It should be appreciated that through the functionality illustrated in FIG. 7A-7B, a great deal of flexibility is provided for specifying virtually any type of text filter to be applied to the contents of the query design surface 200. It should also be appreciated that in response to the creation of the text filter, the database application program 118 updates the query definition 124 appropriately.

Figure 8:
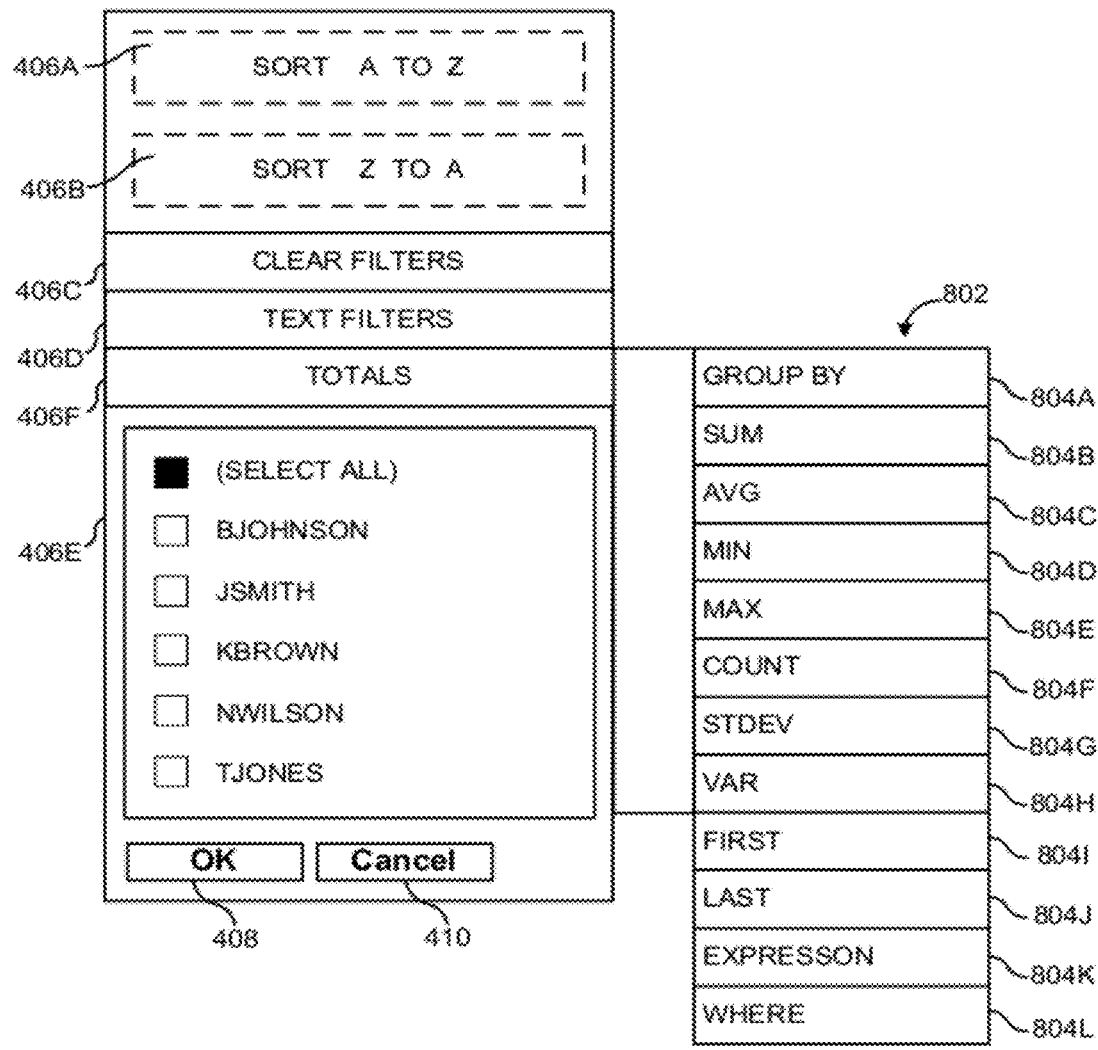

Turning now to FIG. 8, additional details regarding the functionality provided by the query design surface 200 in one embodiment will be described. In particular, in this embodiment, the query design surface 200 includes functionality for grouping and performing arithmetic functions on the records shown within the query design surface 200 such as performing an aggregation operation. In this regard, the menu 404 includes a selectable item 406F which, when selected, will cause a menu 802 to be displayed.

The menu 802 includes selectable items 804A-804L corresponding to the various operations that may be applied to the records within the query design surface 200. Selection of the items 804A-804L will cause a corresponding operation to be applied to the records in the query design surface 200. Additionally, in response to the selection of one of the items 804A-804L, the database application 118 will update the query definition 124 to reflect the selected arithmetic operation. In this manner, a user can quickly apply an aggregate aggregation or another type of arithmetic operation to the records shown in the query design surface 200.

In another implementation, the record shown within the query design surface 200 may be grouped through a user interface that includes an extra row within the query design surface 200. In this implementation, the extra row includes check boxes that may be selected to group a group by a particular column. A similar interface may also be employed to create totals or other aggregates based on one of the columns 202A-202C. It should be appreciated that a user may also be permitted to reorder the columns 202A-202C by dragging and dropping the columns or using another appropriate user input mechanism and may be permitted to specify columns that are part of the database query but that are not shown in the result set.

Figure 9:
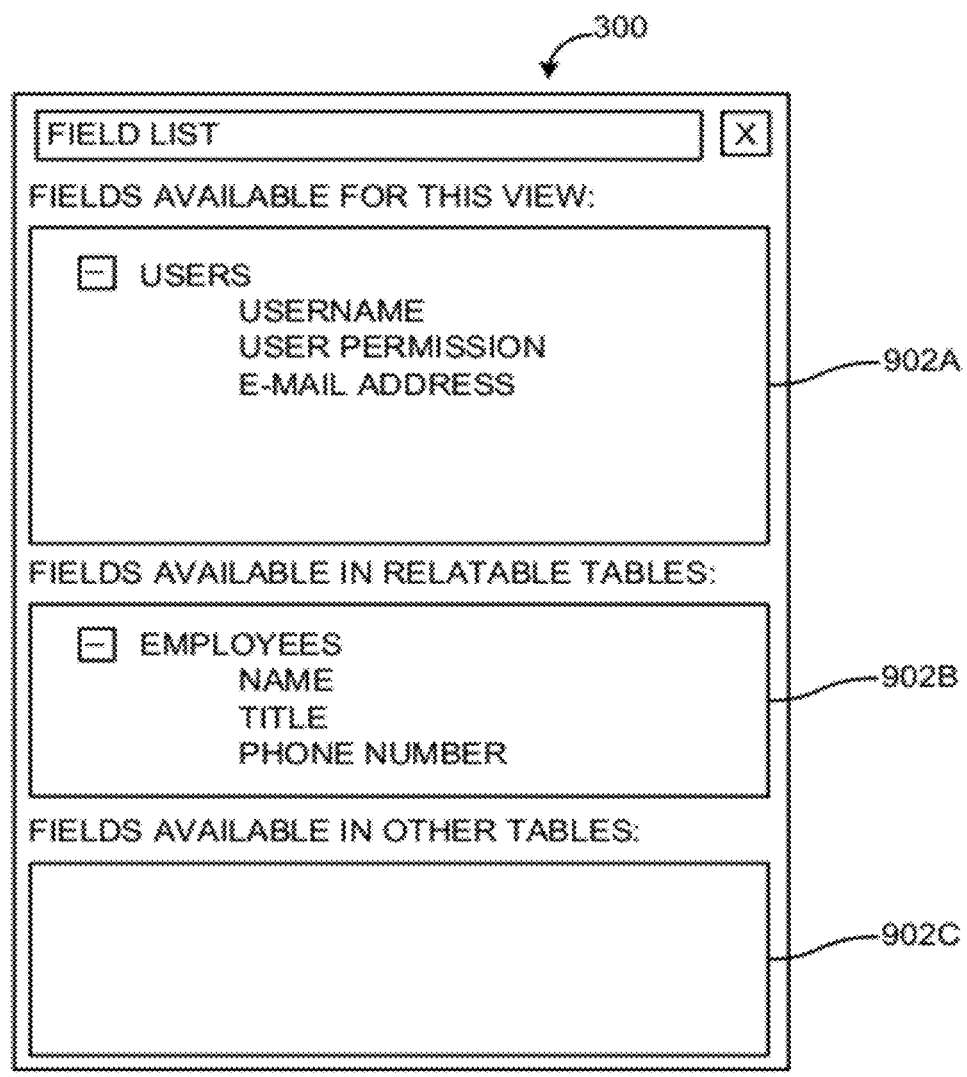

Referring now to FIG. 9, additional details regarding the application of a database join operation to the query design surface 200 will be described. As discussed briefly above with respect to FIG. 3, the field list 300 may be provided in embodiments that identifies the tables and fields available to a user of the database application program 118. For instance, in the implementation shown in FIG. 9, a section 902A identifies the fields corresponding to the currently active database table. The section 902B identifies fields that may be available in related tables. The section 902C indicates fields available in other tables.

As also discussed briefly above, a user may select fields from the section 902B that are available in related tables and drag these fields to the query design surface 200. If a user elects to utilize a field from another table in the same database 122 in this manner, the database application program 118 will attempt to automatically perform the database join operation. If it is not possible for the database application program 118 to automatically perform the join operation, the user may be prompted with a dialog box or other appropriate user interface to control and requested to provide information regarding how the relationship should be defined between the current table and the related table. Once this relationship has been defined, the user can be permitted to insert other fields from the related table without any additional prompting. Once the user has defined the relationship, the database application program 118 also updates the query definition 124 to reflect the specified database join operation.

According to other embodiments, the database application program 118 is also operative to allow a user to define and perform action queries. Action queries are queries that manipulate data within the database 122 rather than just displaying it. The first step in building action queries is to select the data to operate on utilizing the query design surface 200 in the manner described above. When the user elects to build an action query, one or more additional rows may be exposed at the top of the query design surface 200 or exposed in a dialog box to allow a user to specify the remainder of the data needed to perform the requested action query. For instance, in one embodiment, a user may be permitted to perform a delete action query. The delete action query is a select query specified using the query design surface 200 in the manner described above plus the action to remove all of the rows that match the selection. In order to perform a delete action query, a user will build the query as described above using the query design surface 200 and then execute the query to remove the rows shown in the view. The user may be prompted for confirmation that the rows specified within the view shown by the query design surface 200 should be removed from the database 122.

According to other implementations, an update action query may also be provided by the database application program 118. The update action query is a select query plus the action of updating the values of one or more columns. In order to perform an update action query, a user builds a select query utilizing the query design surface 200 in the manner described above and then specifies the fields that should be updated and the values that should be utilized for each field.

An append action query may also be specified using the database application program 118. In this case, the user builds a select query in the manner described above and appends the select query to another table. In this case, the user must be prompted to identify which table the specified records should be added to.

A make table action query may also be performed, which is an append action query where the results are inserted into a newly created table rather than attached to the end of an existing table. It should be appreciated that the action queries identified herein are merely illustrative and that the database application program 118 may also be utilized to perform other action queries based on the results shown in the view provided by the query design surface 200.

Figure 10A:
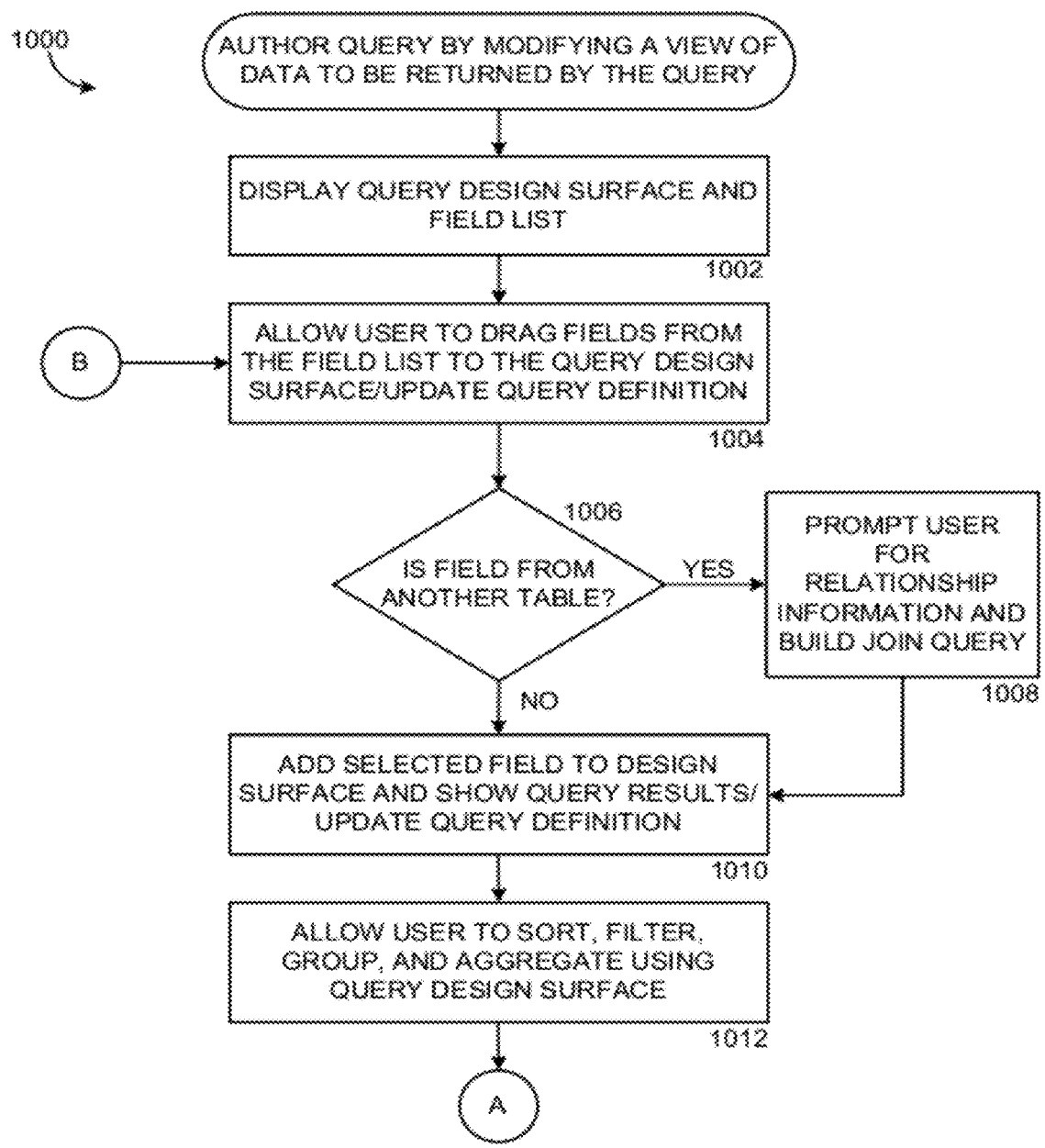
FIGS. 10A-10B are flow diagrams showing an illustrative routine for authoring a database query by modifying a view of the results of the query provided in one embodiment presented herein.
Figure 10B:
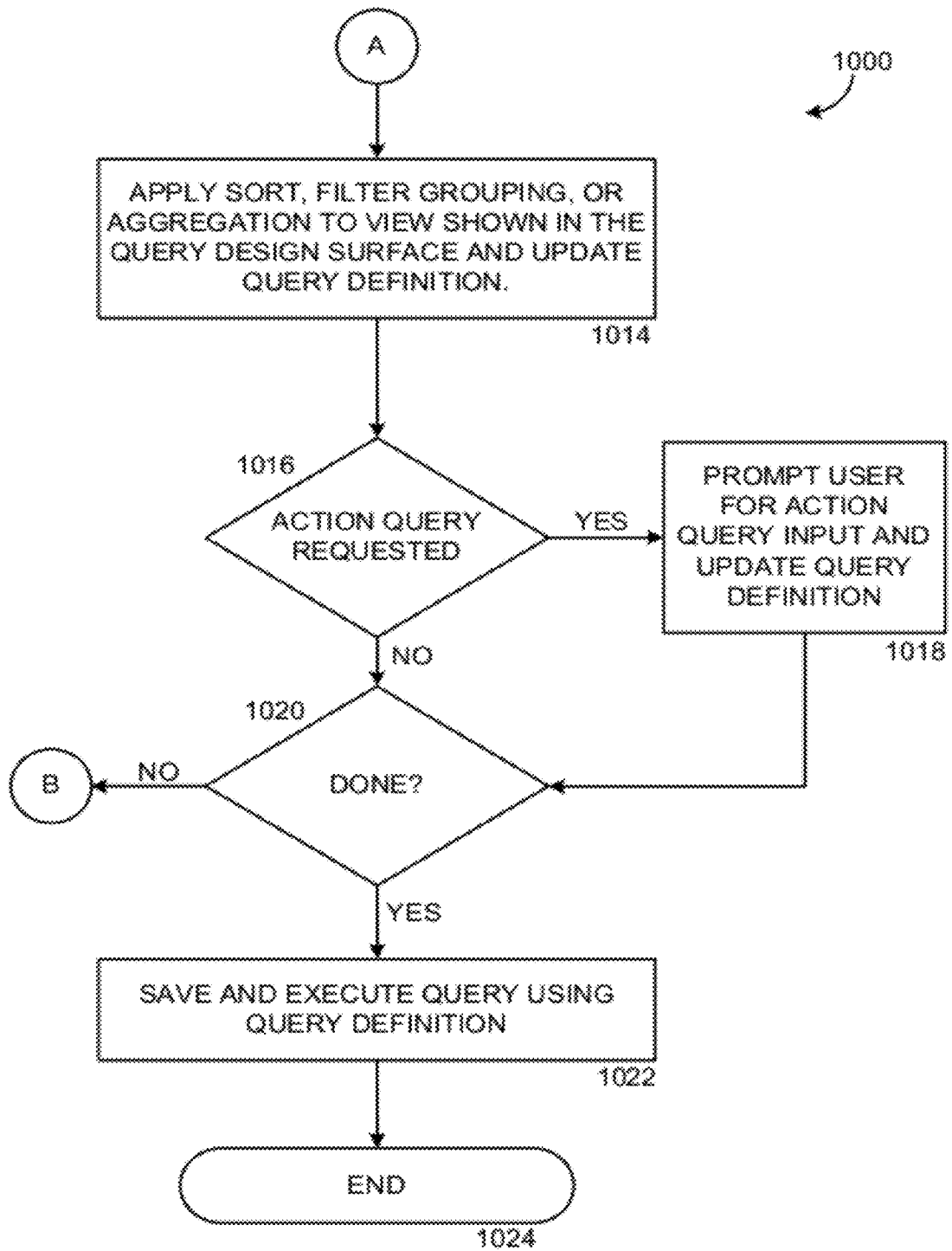

Referring now to FIGS. 10A-10B, additional details will be provided regarding the embodiments presented herein for authoring a database query through the modification of a view of the data to be returned by the query. In particular, FIGS. 10A-10B are flow diagrams showing an illustrative routine 1000 that illustrates aspects of the operation of the database application program 118 for allowing a user to author a database query through the modification of a view of the data to be returned by the query.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof It should also be appreciated that more or fewer operations may be performed than shown in the figures and described herein. These operations may also be performed in a different order than those described herein.

The routine 1000 begins at operation 1002, where the database application program 118 displays the query design surface 200 and the field list 300. The routine 1000 then continues to operation 1004, where the database application program 118 allows a user to drag fields from the field list 300 to the query design surface 200. As fields are dragged onto the query design surface 200 or removed there from, the database application program 118 updates the query definition 124 to reflect the inclusion or removal of fields. From operation 1004, the routine 1000 continues to operation 1006.

At operation 1006, the database application program 118 determines whether the field to be added to the query design surface 200 is contained in another table within the database 122 other than the currently active table. If so, the routine 1000 proceeds from operation 1006 to operation 1008, where the database application 118 attempts to automatically perform a database join operation with the new table. If the database join operation cannot be automatically be performed, the database application program 118 prompts the user for information defining the relationship and builds the appropriate database join. The database application program 118 also updates the query definition 124 to reflect the database join operation. From operation 1008, the routine 1000 continues to operation 1010.

If, at operation 1006, the database application program 118 determines that the field selected from the field list 300 is not from another table, the routine 1000 proceeds from operation 1006 directly to operation 1010. At operation 1010, the database application program 118 adds the selected field to the query design surface 200 and shows the results of adding the field thereto. The database application program 118 also updates the query definition 124 to reflect the addition of the new field to the query design surface 200. It should be appreciated that fields may be removed from the query design surface 200 in a similar fashion.

From operation 1010, the routine 1000 continues to operation 1012, where the database application program 118 provides the functionality described above for allowing a user to sort, filter, group, aggregate, and perform other options on the results shown in the view provided by the query design surface 200. The routine 1000 then continues to operation 1014 where the database application program 118 applies the sort, filter, grouping, or aggregation operations to the view shown by the query design surface 200. The database application program 118 also updates the query definition 124 to reflect the specified operations.

From operation 1014, the routine 1000 proceeds to operation 1016, where the database application program 118 determines whether the user has requested to perform an action query. If an action query has been requested, the routine 1000 proceeds to operation 1018, where a user is prompted for any input necessary to perform the action query as described above. The query definition 124 is then updated to reflect the action query. The database application program 118 then performs the database action query on the database 122.

If, at operation 1016, the database application program 118 determines that an action query was not requested, the routine 1000 proceeds from operation 1016 to operation 1020, where a determination is made as to whether the user has completed defining the database query. If not, the routine 1000 returns from operation 1020 to operation 1004 where the user is permitted to continually utilize the query design surface 200 to further define the database query. If the user has completed defining their database query using the query design surface 200, the routine 1000 proceeds to operation 1022 where the query definition 124 is saved and run against the database 122 to retrieve the desired search query results. From operation 1022, the routine 1000 proceeds to operation 1024, where it ends.

Based on the foregoing, it should be appreciated that technologies for authoring a database query through the modification of a view of the data to be returned by the query are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for authoring a database query by modifying a view of results of the database query, the method comprising:
    generating a query design surface that displays the view of the results of a database query definition, the query design surface comprising a grid displaying rows of database records from at least one database table returned by the database query and columns of fields from the at least one database table returned by the database query;
    providing at least one user interface control element for modifying the columns of fields of the query design surface, the at least one user interface control element comprising a field list displaying first available fields from a first database table and second available fields from a second database table for adding one or more fields to the view of the results;
    receiving input via the at least one user interface control element that adds a field to be displayed in the query design surface from the field list of one of the first available fields from the first database table or the second available fields from the second database table, wherein the received input comprises user input dragging the field to be displayed in the query design surface from the field list onto the query design surface; and
    generating an updated database query definition based on receiving the input that modifies the query design surface to reflect the adding of the field from one of the first database table or the second database table to the fields displayed in query design surface.

2. The method of claim 1, further comprising:
    receiving input via the at least one user interface control element for modifying an order of records within the columns of fields shown in the query design surface;
    receiving input via the at least one user interface control element for modifying a new order of the records within the columns of fields; and
    in response to receiving the new order of the records within the columns of fields, updating the database query definition to reflect the new order of the records within the columns of fields.

3. The method of claim 1, further comprising:
    receiving input via the at least one user interface control element for sorting the rows of database records in the query design surface based on a field contained in the query design surface; and
    in response to the sorting the rows of the database records in the query design surface based on the field contained in the query design surface, updating the database query definition to reflect the sorting the rows of the database records in the query design surface.

4. The method of claim 1, further comprising:
    receiving input via the at least one user interface control element for grouping the rows of database records in the query design surface; and
    in response to the grouping the rows of database records in the query design surface, updating the database query definition to reflect the grouping the rows of database records in of the query design surface.

5. The method of claim 4, further comprising:
    receiving input via the at least one user interface control element for aggregating values of database records in the query design surface; and
    in response to the aggregating the values of database records in the query design surface, updating the database query definition to reflect the aggregating the values of database records in of the query design surface.

6. The method of claim 1, further comprising:
    receiving input via the at least one user interface control element for defining and executing an action query based upon the database query definition, the action query comprising one of a delete query, an update query, an append query, or a make table query.

7. The method of claim 1, further comprising:
    receiving a second input via the at least one user interface control element that removes a field displayed in the query design surface, wherein the received second input comprises user input dragging a field displayed in the query design surface from the query design surface; and
    generating an updated database query definition based on receiving the second input that modifies the query design surface to reflect the removal of the field from the fields displayed in the query design surface.

8. At least one of an optical disk, a magnetic storage device or a solid state storage device having computer executable instructions stored thereon which, when executed by a computer, cause the computer to:
    display a query design surface that displays a view of results of a definition of a database query, the query design surface configured to display a grid displaying rows of database records from at least one database table returned by the database query and columns of fields from the at least one database table returned by the database query;
    provide at least one user interface control element for allowing a user to interact with one or more fields of the query design surface, the at least one user interface control element comprising a field list displaying first available fields from a first database table and second available fields from a second database table for adding one or more fields to the view of the results;
    receive input via the at least one user interface control element that adds one of the first available fields from the first database table or the second available fields from the second database table from the field list to be displayed in the query design surface, wherein the received input comprises user input dragging the one of the first available fields from the field list onto the query design surface;
    modify the results of the database query shown in the query design surface by adding the one of the first available fields from one of the first database table or the second database table from the field list to the one or more fields of the query design surface based on receiving the input via that at least one user interface control element; and
    generate an updated database query definition based on receiving the input that modifies the query design surface to reflect the adding of the field from one of first database table or the second database table to the one or more fields of the query design surface.

9. The optical disk, magnetic storage device or solid state storage device of claim 8, wherein each of the columns of fields correspond to a field in the at least one database table.

10. The optical disk, magnetic storage device or solid state storage device of claim 8, wherein each of the rows of database records correspond to a record within the at least one database table.

11. The optical disk, magnetic storage device or solid state storage device of claim 8, wherein the at least one user interface control element being interactive for one of sorting or filtering records within the columns of fields shown in the query design surface.

12. The optical disk, magnetic storage device or solid state storage device of claim 8, wherein the at least one user interface control element further comprises a user interface for one of grouping or aggregating records within the columns of fields shown in the query design surface.

13. The optical disk, magnetic storage device or solid state storage device of claim 8, wherein the at least one user interface control element further comprises a user interface for performing a database join operation between at least one first available field from the first database table and at least one second available field from the second database table,
   wherein the database join operation comprises adding the at least one second available field from the second database table from the field list to the query design surface displaying a record from the first database table.

14. The optical disk, magnetic storage device or solid state storage device of claim 8, further causing the computer to:
   receive a second input via the at least one user interface control element that removes one of the fields displayed in the query design surface, wherein the received second input comprises user input dragging the one of the fields from the query design surface; and
   generate an updated database query definition based on receiving the second input that modifies the query design surface to reflect the removal of the field from the fields displayed in the query design surface.

15. A method for authoring a database query by modifying a view of results of the database query, the method comprising:
   displaying a query design surface, the query design surface configured to display the view of the results of the database query comprising one or more columns and one or more rows, each of the one or more columns corresponding to a field in a database table and each of the one or more rows corresponding to a record within the database table;
   providing at least one user interface for interacting with the query design surface to define the results of the database query displayed in the view of results, the at least one user interface comprising a field list displaying first available fields from a first database table and second available fields from a second database table for adding one or more fields to the view of results;
   receiving input via the at least one user interface that adds a field to be displayed in the query design from the field list of one of the first available fields from the first database table or the second available fields from the second database, wherein the received input comprises user input dragging the field to be displayed in the query design surface from the field list onto the query design surface; and
   generating an updated database query definition capable of returning the results of the database query shown in the view based on receiving the input that modifies the query design surface to reflect the adding of the field from one of the first available fields from the first database table or the second available fields from the second database table to the one or more fields shown in query design surface.

16. The method of claim 15, wherein the at least one user interface further comprises a user interface for grouping or aggregating database records based on modifying the one or more fields shown in the query design surface.

17. The method of claim 16, the method further comprising a database join operation between at least one first available field from the first database table shown in the query design surface and at least one second available field from the second database table,
   wherein the database join operation comprises adding the at least one second available field from the second database table from the field list to the query design surface displaying a record from the first database table.

18. The method of claim 15, further comprising:
   receiving second input via the at least one user interface that removes a field displayed in the query design surface, wherein the received second input comprises user input dragging the field displayed in the query design surface from the query design surface; and
   generating an updated database query definition based on receiving the second input that modifies the query design surface to reflect the removal of the field from fields displayed in the query design surface.

* * * * *